UNITED STATES PATENT OFFICE 2,341,258

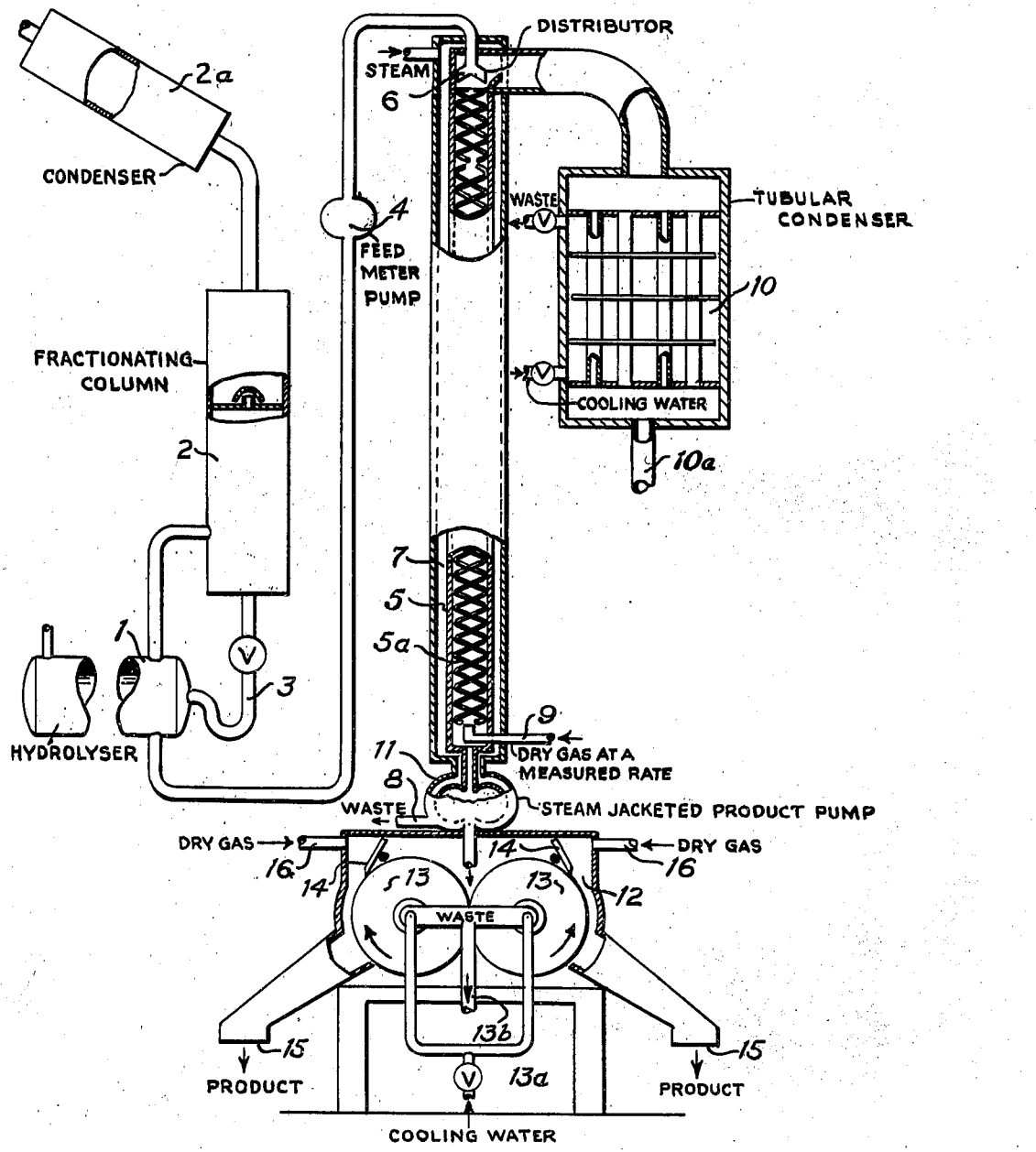

PROCESS FOR THE PREPARATION OF FLAKE HYDROXYACETIC ACID

Frank John Appel, Wilmington, Del., assignor to E. I. du Pont de Nemours & Company, Wilmington, Del., a corporation of Delaware Application March 25, 1942, Serial No. 436,160

8 Claims. (Cl. 260—535)

This invention relates to a process for the preparation of pure hydroxyacetic acid crystals and more particularly to the preparation of microcrystal-flake hydroxyacetic acid from esters of the acid.

Hydroxyacetic acid is an intra-reacting difunctional compound and consequently may form under certain conditions such products as polyhydroxyacetic acid (polyglycolide), diglycolide, diglycolic anhydride, glycolic acid anhydride and other polymeric products. The reactions illustrating the formation of some of these products may be represented thus:

$(x+2)$ HOCH$_2$COOH→
HOCH$_2$CO(OCH$_2$CO)$_x$OCH$_2$COOH+$(x+1)$H$_2$O $(x=0, 1, 2, 3 \ldots)$

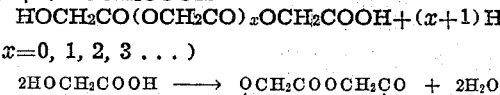

2HOCH$_2$COOH→HOCH$_2$CO.O.COCH$_2$OH+H$_2$O

HOCH$_2$CO.O.COCH$_2$OH+2HOCH$_2$COOH→
HOCH$_2$COOCH$_2$CO.O.COCH$_2$OOCCH$_2$OH+2H$_2$O

The products (which will herein be referred to as a mixture of polyacids) may be formed from hydroxyacetic acid by self-esterification at elevated temperatures and preferably reduced pressure. Recent experiments have revealed that for every concentration of hydroxyacetic acid there is an equilibrium concentration of polyacids and free acid and if hydroxyacetic acid is crystallized from such solutions these polymers are present to a greater or lesser extent.

An object of the present invention is to provide a process for the preparation of pure hydroxyacetic acid. Another object is to provide a process for the preparation of solid easily water soluble hydroxyacetic acid from esters of the acid. Another object is to provide a process for the hydrolysis, without the use of added hydrolyzing catalyst, of water-miscible carboxylic acid esters of alcohols which alcohols have a lower boiling point than the ester. Yet another object is to provide a process for the preparation of microcrystal-flake hydroxyacetic acid from aqueous solutions containing less than 50% acid or from esters thereof by hydrolysis, rapid evaporation, and rapid solidification of the anhydrous acid. Another object is to provide a new product, namely microcrystal-flake hydroxyacetic acid containing at least 90% free monomeric acid.

In general, the first, or hydrolysis, step of the process may be effected by treating a refined water-miscible ester of hydroxyacetic acid with water and, in the absence of added hydrolysis catalysts, other than hydroxyacetic acid, subsequently hydrolyzing the mixture. During the hydrolysis the reacting mixture is subjected to controlled reflux and distillation whereby all of the alcohol formed is removed. An aqueous hydroxyacetic acid remains which contains equilibrium amounts of the polyacids with no ester or alcohol. This acid may be treated in the second step of the process for the preparation of (1) microcrystal-flake hydroxyacetic acid containing only the amount of polyacids present at the end of the hydrolysis step, (2) coarse crystallized acid, and (3) a mixture of polyacids.

The first product, viz. microcrystal-flake hydroxyacetic acid may be obtained by evaporating as rapidly as possible the water from a hydroxyacetic acid solution of hydrolysis step which solution contains at least 50% water, the evaporation being conducted by, for example, passing the aqueous hydroxyacetic acid into a falling-film evaporator which will be more fully particularized hereinafter. Rapid removal of the water at this stage of the processes is important for should the water be removed slowly, equilibrium concentrations of water soluble polymers would form and polyacids, in addition to those formed during the hydrolysis step, would appear in the final product. The presence of polyacids is not only undesirable from the standpoint of purity of the product but also because their presence in appreciable amounts will prevent the formation of microcrystal-flake acid (this subject will be more fully particularized hereinafter).

The concentration of the hydroxyacetic acid obtained at the end of the above hydrolysis step determines in large measure the concentration of polyacids found in the product. There follows a table showing the equilibrium concentration of calculated polyacids present in aqueous solutions of hydroxyacetic acid at 100° C.

*Per cent acid by weight as hydroxyacetic at equilibrium*

| Free acid | Calculated polyacid difference between total and free acid | Total available acid |
|---|---|---|
| 28.5 | 1.5 | 30.0 |
| 37.8 | 2.2 | 40.0 |
| 47.2 | 2.8 | 50.0 |
| 56.3 | 3.7 | 60.0 |
| 63.7 | 6.3 | 70.0 |
| 69.4 | 10.6 | 80.0 |
| 71.5 | 18.5 | 90.0 |
| 68.5 | 31.5 | 100.0 |

It will be seen from this table that above 50% total acid and especially above 60% total acid the polyacids increase rapidly. Because of this it is necessary, in order to obtain an acid low in polyacid (i. e. one containing less than 6.2% weight percent polyacid expressed as hydroxyacetic, and calculated by subtracting the titer of total acid from the titer of free acid, herein called calculated polyacid) to feed an aqueous solution containing less than 60% total acid to the evaporator. The free monomeric acid content of the solution at the end of the hydrolysis is determined by the amount of water added to the ester prior to hydrolysis, the quantity of water added being just sufficient to give after hydrolysis the desired concentration of acid, the amount being determined by simple stoichiometrical calculations based on the equation:

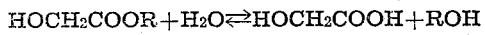
$$HOCH_2COOR + H_2O \rightleftharpoons HOCH_2COOH + ROH$$

A small excess over the calculated value, say ½ to 5% may be added which is used to aid in the removal of the last traces of alcohol. This phase of the process will be more fully discussed below.

Self-esterification of the acid to form a polyacid

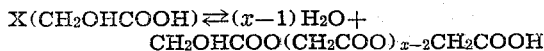
$$X(CH_2OHCOOH) \rightleftharpoons (x-1)H_2O + CH_2OHCOO(CH_2COO)_{x-2}CH_2COOH$$

is favored by an increase of temperature from 30 to 100° C., although the rate at which this equilibrium is established is dependent, it has been found, upon the concentration and temperature. Because of this rate relationship, it is desirable that the dilute acid be concentrated as rapidly as possible with a minimum of exposure to high temperatures. The use of flash evaporation satisfies these conditions of concentration and such evaporation should be conducted under a vacuum of 400 mm. and preferably under 100 mm. If a vacuum of 100 mm. or higher, up to for that matter atmospheric pressure or above is used, it is preferable to pass a dry inert gas through the column to sweep out the water vapor.

The use of a dry inert gas such as nitrogen, carbon dioxide, and the like to sweep the water out of the evaporator has resulted in a decided improvement over conducting the evaporation in its absence. Not only does the gas increase the efficiency of an evaporating tube but also it has the ability of removing colored impurities from the acid. Aqueous acids which were off color have been concentrated to a colorless crystal acid when more deeply colored products were to be expected. The rate of sweeping gas may be regulated within fairly wide limits in accordance with the purity, or lack of purity of the aqueous acid to be dehydrated.

The dehydration of the acid is effected preferably at a temperature between the melting point of the acid (i. e. about 78° C.) and 110° C. The aqueous acid should, for optimum results, be converted to the molten, water-free acid in from one to two minutes and preferably in less than 0.6 minute to limit polymer formation to minimum amounts for during this period polyacids will form at an accelerated rate. The molten acid is hygroscopic and should accordingly be rapidly solidified to the solid acid. Solidification may be carried out by pouring the acid melt over, on, or through a chilled heat conducting surface or tubes preferably in a dry atmosphere. The dry cooled solid is then placed directly in moisture-proof containers without undue exposure to atmospheric moisture. The product thus obtained is microcrystal-flake hydroxyacetic acid. It is unusual in its physical and chemical properties as it is in flake form, the individual flakes consisting of a loosely held mass of very fine crystals which are mainly holohedral and optically homogeneous ranging from 100 to 300 microns. The preferred product is prepared from a solution containing less than 60% acid and will contain preferably not less than 93.8% free monomeric acid expressed as hydroxyacetic acid. In the specification and claims, microcrystal-flake hydroxyacetic acid will include these products, i. e. hydroxyacetic acid in the form of flakes which are masses of small crystals.

It has been found that if the percentage of free monomeric acid be allowed to fall below approximately 90% and the polyacids allowed to increase above 10%, and if the conditions are employed similar to those used for crystallization of a product having a larger percentage of free monomeric acid, a product is obtained in a non-crystal form. Such products will often be sticky, amorphous, stringy masses in many cases difficult to handle. It is often possible to prepare microcrystal-flakes from such products if the chilling is carried out at very low temperatures but if the percentage of polyacid is increased much beyond the above values, a point is reached at which microcrystal-flakes have not been obtained. As has been stated, the presence of polyacids in the final product is increased by using an aqueous solution having concentrations of the hydroxyacetic acid above approximately 60% and likewise the concentrations of these polyacids in the final product will be increased from any given aqueous acid by raising the temperature during the evaporation step, or increasing the time.

The second, or coarse crystalline acid product may be formed by transferring the dehydrated acid to a crystallizing pan and allowing the molten acid to cool slowly. The crystal size of the product is determined by controlling the rate of cooling. The crystals obtained by this method range in size from 500 microns to 600 microns or above.

The third polyacid product may be formed by the dehydration of aqueous hydroxyacetic acid at temperatures above 60 or 100° C. for an extended period of time, the longer the period and the higher the temperature of heating the higher will be the molecular weight of the polymeric acid obtained, the polyacid product being usually ground to the desired particle size prior to use. Alternatively this product can be produced by hydrolyzing the ester to a high acid solution say 75% or better and concentrating this aqueous product to 100% acid by evaporation. The hydrolysis and evaporation can, if desired, be conducted in the first step of the process, the alcohol formed and the water present being distilled off during the hydrolysis. The resulting molten acid is subsequently dehydrated further under atmospheric pressure and/or vacuum to remove combined water and to give the polyhydroxyacetic acid desired which may analyze from above 100 up to 131% calculated hydroxyacetic acid (by saponification).

A method of carrying out the invention is illustrated diagrammatically in the single figure. A mixture of a lower alkyl ester of hydroxyacetic acid and water is placed in the hydrolysis vessel 1 together, if desired, with some hydroxyacetic acid wherein the ester is hydrolyzed at a temperature of from 40 to 175° C., the hydrolysis vessel 1 is provided with a fractionating column 2 and condenser 2a. As the hydrolysis proceeds, the alcohol formed and the water present distill into column 2. The reflux is so controlled that only the alcohol distills off, the water returning through pipe 3 to the hydrolyzer 1. As stated above it is often advantageous to add an excess of water over and above the amount calculated to give a hydrolyzed acid of a certain concentration. The excess of water is distilled over at this stage in the process to remove the last traces of alcohol. The resulting aqueous hydroxyacetic acid is then pumped by the feed metering pump 4 into the top of a falling-film evaporator tube 5 the inner surface of which is interlined with a spirally wound wire 5a for holding the aqueous acid in contact with the walls of the evaporator tube 5. The aqueous acid is passed into the evaporator tube 5 over the distributor 6 and flows downwardly in a spiral path, around the walls of the evaporator tube, the tube being heated by means of steam injected into the cellular space 7 which surrounds the tube, while the steam condensate passes to waste at 8. A dry inert gas, which may be nitrogen or other gas which will not react with the acid, is introduced through pipe 9 into the bottom of the tube and passes upwardly counter-current to the flow of descending aqueous hydroxyacetic acid. The dry gas strips the aqueous hydroxyacetic acid free of water and discharges it from the top of the tube into the condenser 10 which is cooled in the manner shown. The condensate from condenser 10 contains some acid and may be returned to the hydrolyzing step or discharged to waste. The evaporator tube 5 is maintained preferably under vacuum which may be applied through the exit 10a of the condenser 10. The hot hydroxyacetic acid becomes more and more concentrated as it passes downwardly through the tube 5 the flow of aqueous acid and the flow of dry gas, together with the temperature of the tube, being so regulated that as the acid reaches the bottom of the evaporator it is substantially water-free hydroxyacetic acid. The dehydrated acid at this point is above the melting point of the acid and consequently in the molten state. From the tube the acid melt is pumped through the steam jacketed pump 11 into the solidifying chest 12 provided with two cylindrical rolls 13 preferably chromium plated, and rotating in the directions shown. Chest 12 can, if desired, be maintained under the same pressure as the evaporating tube 5 in which event suitable crystal discharge traps should be provided in discharge ducts 15. With equalized pressure in tube 5 and chest 12 the product pump 11 can be dispensed with. The rolls 13 are chilled to about 30° C. or below by the circulation of cold water or brine, the water entering the rolls through pipes 13a concentrically disposed in pipes 13b which discharge the cooling liquid. The hot substantially 100% hydroxyacetic acid flowing between the rotating rolls 13 rapidly solidifies on their cool surfaces, and is scraped from the rolls 13 by means of the doctor knives 14 the acid crystals then being discharged into suitable airtight receptacles, not shown, through the discharge ducts 15. In order to prevent the absorption of moisture by the acid during its solidification on the rolls, the solidifying chest 12 is filled with a dry inert gas which is introduced at points 16 and is discharged through the discharge ducts 15.

The examples which follow illustrate the process and give details of preferred embodiments thereof.

*Example 1.*—450 parts of methyl hydroxyacetate and 470 parts of water were heated in a suitable hydrolysis vessel at atmospheric pressure. The mixture was refluxed for ½ hour and methanol then distilled over, 160 parts of methanol was recovered with a few parts of water, the distillation requiring approximately five hours. There remained in the hydrolysis vessel an aqueous solution containing approximately 50% hdroxy-acetic acid. This aqueous acid was fed at a temperature of about 100° C. and at a rate of approximately 50 parts per minute into the top of an evaporating tube provided with internally wound spiral turns of wire and the flow of acid directed against the inner walls of the tube. The acid passed downwardly through the tube by gravity and was discharged at the bottom. The calculated contact time of the acid with the walls of the tube was approximately ½ minute. It was found, however, that this contact time may range from approximately 0.1 to 2.0 minutes but even with the latter contact time the amount of polyacid in the product increased considerably. It was found advisable, therefore, to limit preferably the contact time to between ⅓ and ¾ minute. The dehydrated acid issuing from the tube was forced against the outer surface of rotating chromium plated cooled rolls and recovered therefrom in approximately a 96.7% yield. The acid consisted of microcrystals loosely combined together in flake form and analyzed 95.35% free acid and 98.57% total acid, calculated as hydroxyacetic acid, the difference being a mixture herein referred to as polyacids.

*Example 2.*—694 parts of methyl hydroxyacetic acid and 725 parts of water were hydrolyzed substantially in accord with the process of Example 1 to give an aqueous acid containing approximately 50% acid. This acid was charged, substantially in accord with the procedure given in Example 1, into a tubular evaporator having a ratio of length to diameter of from 30 to 1 to 75 to 1 and preferably about 60 to 1, the walls of which were maintained at approximately 100° C., the acid being introduced at a rate of approximately 50 parts per minute. Dry nitrogen was forced in the bottom of the tubular evaporator at a rate of approximately 45 cubic feet per minute per pound of water introduced into the top of the evaporator. It has been found that the rate at which the inert gas may be introduced into the evaporator may range between 20 and 75 cubic feet per minute per pound of the water to be removed and preferably between 35 and 55 cubic feet per minute. The microcrystal-flakes of hydroxyacetic acid were recovered in accord with the process of Example 1 by forcing the molten water free acid against chilled crystallizing molds. A 98.4% conversion of the acid was obtained having substantially the composition of the product of Example 1.

It has been found that the water-miscible esters which can be hydrolyzed in accord with this invention include the esters of the aliphatic organic acids and especially the hydroxy-substituted organic acids such as hydroxyacetic acid, α-hydroxyisobutyric acid, and especially the lower alkyl esters of these acids such as the methyl, ethyl, propyl, and butyl esters. The process is likewise applicable to preparing crystalline mixed acids from, for example, mixtures of esters of hydroxyacetic and esters of α-hydroxyisobutyric acids, the crystalline mixed acids are also interpolymers. These esters do not require the use of added foreign hydrolysis catalysts, although, of course, they may be used, for the acid obtained during the initial stages of the hydrolysis is an effective catalyst. Inasmuch as the acids may be used for comestible purposes the advantages of providing such a process are self-evident.

The microcrystal-flake hydroxyacetic acid obtained in accord with the preferred process of the invention consists of surprisingly small and unexpectedly uniform halohedral crystals in conglomerates of flake form. This form of crystal is the result of very rapid solidification, for the time interval permitted in cooling the molten 100% hydroxyacetic acid, which is largely in the monomeric state, to around room temperature is from 5 to 45 seconds and preferably less than 30 seconds. Because of this crystal form, the low polyhydroxyacetic acid content and especially because of the absence of contaminating catalyst acids, the product is adapted to comestible uses and for addition to potable liquids. The ease and rapidity of its solution in water likewise has made it highly acceptable for many uses in the arts.

I claim:

1. A process of preparing flake hydroxyacetic acid which comprises heating a lower alkyl ester of hydroxyacetic acid in the presence of water to hydrolyze the ester to hydroxyacetic acid, removing the alcohol by distillation, rapidly dehydrating the resulting aqueous hydroxyacetic acid at a temperature above the melting point of the acid and below 110° C. and subsequently rapidly cooling to solidify the resulting molten acid immediately after dehydration, an amount of water being present to give at least 40% water subsequent to the removal of the alcohol by distillation and prior to dehydration.

2. The process of claim 1 in which the dehydration of the aqueous acid is effected in from 0.1 to 2 minutes.

3. The process of claim 2 in which the crystallization of the molten hydroxyacetic acid is effected in less than thirty seconds.

4. The process of claim 1 in which the dehydration of the aqueous acid is effected in less than one minute and the crystallization of the molten acid is effected in less than 30 seconds.

5. A process for the preparation of flake hydroxyacetic acid which comprises heating methyl hydroxyacetate in the presence of water to hydrolyze the ester to hydroxyacetic acid, removing the methanol substantially when formed, dehydrating the resulting aqueous hydroxyacetic acid at a temperature between approximately 78° C. and approximately 110° C. at a rate sufficient to inhibit the formation of appreciable quantities of polymeric products, and immediately after dehydration rapidly cooling and crystallizing the molten hydroxyacetic acid, an amount of water being present to give at least 40% water subsequent to the removal of the alcohol by distillation and prior to dehydration.

6. A process of preparing flake hydroxyacetic acid which comprises heating a lower alkyl ester of hydroxyacetic acid to a temperature between 40 and 175° C. in the presence of sufficient water to hydrolyze the ester to hydroxyacetic acid and give after hydrolysis and removal of alcohol at least 50% water, removing the alcohol during hydrolysis substantially when formed, rapidly dehydrating the acid solution at a temperature between 78° C. and 110° C. and subsequently immediately after dehydration rapidly cooling and crystallizing the thus dehydrated hydroxyacetic acid.

7. A process of preparing flake hydroxyacetic acid which comprises heating 450 parts of methyl hydroxyacetate in the presence of 470 parts of water under reflux for approximately ½ hour, distilling off the methanol substantially when formed, rapidly dehydrating the resulting aqueous acid at a temperature of approximately 100° C. and rapidly cooling the dehydrated molten acid to a crystalline solid.

8. In a process for the preparation of flake hydroxyacetic acid, the step which comprises rapidly cooling a molten mixture consisting essentially of 95.35% free hydroxyacetic acid and approximately 3.22% polyhydroxyacetic acids, with a total acid content of 98.57%, to below its solidification temperature.

FRANK JOHN APPEL.

CERTIFICATE OF CORRECTION.

Patent No. 2,341,258. February 8, 1944.

FRANK JOHN APPEL.

It is hereby certified that error appears in the printed specification of the above numbered patent requiring correction as follows: Page 3, second column, line 4, for "hdroxy-acetic" read --hydroxyacetic--; page 4, first column, line 36, claim 3, for the claim reference numeral "2" read --1--; and that the said Letters Patent should be read with this correction therein that the same may conform to the record of the case in the Patent Office.

Signed and sealed this 9th day of May, A. D. 1944.

Leslie Frazer

(Seal) Acting Commissioner of Patents.